United States Patent
Freifeld et al.

(10) Patent No.: US 9,939,624 B2
(45) Date of Patent: Apr. 10, 2018

(54) FIVE AXIS OPTICAL INSPECTION SYSTEM

(71) Applicant: Electro Scientific Industries, Inc., Portland, OR (US)

(72) Inventors: Daniel Freifeld, Napa, CA (US); John Burnett, Vacaville, CA (US); Minh Chau Ngo, Oakland, CA (US)

(73) Assignee: Electro Scienctific Industries, Inc., Portland, OR (US)

( * ) Notice: Subject to any disclaimer, the term of this patent is extended or adjusted under 35 U.S.C. 154(b) by 218 days.

(21) Appl. No.: 14/705,056

(22) Filed: May 6, 2015

(65) Prior Publication Data
US 2015/0323773 A1    Nov. 12, 2015

Related U.S. Application Data

(60) Provisional application No. 61/989,611, filed on May 7, 2014.

(51) Int. Cl.
*H04N 9/47* (2006.01)
*H04N 7/18* (2006.01)
(Continued)

(52) U.S. Cl.
CPC ......... *G02B 21/26* (2013.01); *G02B 21/0016* (2013.01); *G02B 21/362* (2013.01); *G02B 21/367* (2013.01); *H04N 5/2256* (2013.01)

(58) Field of Classification Search
CPC ............... G01N 21/94; G01N 21/9501; G01N 2223/611; G01N 2223/3306;
(Continued)

(56) References Cited

U.S. PATENT DOCUMENTS

| | | | |
|---|---|---|---|
| 5,125,035 A | 6/1992 | McCarthy et al. |
| 5,815,666 A | 10/1998 | Freifeld |

(Continued)

FOREIGN PATENT DOCUMENTS

| | | |
|---|---|---|
| WO | WO99/62263 A1 | 12/1999 |
| WO | 03046632 A1 | 5/2003 |
| WO | 03/046632 A1 | 6/2003 |

OTHER PUBLICATIONS

Written Opinion dated Sep. 11, 2015 concerning PCT Application No. PCT/US2015/29436, which corresponds with the subject U.S. Appl. No. 14/705,056. 6 pages.
(Continued)

*Primary Examiner* — Jared Walker

(57) ABSTRACT

An inspection system that is effective to collect images of a part under inspection. This inspection system includes (a) a three axis linear motion stage; (b) a rotary fourth axis stage configured to hold and rotate an object to be inspected. This rotary fourth axis stage is mounted on the three axis linear stage; (c) a fifth axis camera and optical system mounted to one of the axes of the three axis linear motion stage. This fifth axis camera has an optical axis substantially parallel to the axis of linear motion; (d) a 45 degree mirror configured to bend the optical axis of the fifth axis camera by 90° to point towards the object; and (e) a motor configured to rotate the mirror over a range of angles to obtain a fifth axis of viewing orientation.

11 Claims, 2 Drawing Sheets

(51) Int. Cl.
*G02B 21/26* (2006.01)
*G02B 21/00* (2006.01)
*H04N 5/225* (2006.01)
*G02B 21/36* (2006.01)

(58) Field of Classification Search
CPC .... G01N 2223/6113; G01N 2223/6116; G02B 21/26; G02B 21/0016; G02B 21/34
USPC .......................................................... 348/79
See application file for complete search history.

(56) References Cited

U.S. PATENT DOCUMENTS

| | | | |
|---|---|---|---|
| 6,111,243 A | | 8/2000 | Lara |
| 6,646,750 B1 | | 11/2003 | Christoph |
| 6,665,080 B1 | | 12/2003 | Haertig et al. |
| 6,667,762 B1 | | 12/2003 | Bouvier et al. |
| 6,822,749 B1 | | 11/2004 | Christoph |
| 8,811,691 B2 | | 8/2014 | Freifeld |
| 2006/0262295 A1* | | 11/2006 | Backhauss ......... G01N 21/9501 356/237.2 |
| 2010/0014747 A1 | | 1/2010 | Freifeld |
| 2010/0262230 A1 | | 10/2010 | Vecerina et al. |
| 2010/0295938 A1* | | 11/2010 | Hahn ................. G01N 21/9501 348/126 |
| 2010/0309307 A1 | | 12/2010 | Jin |
| 2011/0001972 A1* | | 1/2011 | Shishido .................. G01J 3/10 356/369 |
| 2011/0007151 A1 | | 1/2011 | Goldberg |
| 2011/0242308 A1* | | 10/2011 | Igarashi ............. G01N 21/6458 348/79 |
| 2012/0105576 A1 | | 5/2012 | Hacke et al. |
| 2014/0293411 A1* | | 10/2014 | Kaneki .................. G02B 21/06 359/385 |

OTHER PUBLICATIONS

PCT/US15/29436, International Search Report, Oct. 6, 2015.
European Search report dated Oct. 20, 2017 concerning European Patent Application No. 1579010.1, which corresponds with the subject U.S. Appl. No. 14/705,056, 9 pages.

* cited by examiner

FIVE AXIS OPTICAL INSPECTION SYSTEM

CROSS-REFERENCE TO RELATED PATENT APPLICATION

This patent application claims a benefit to the May 7, 2014 filing date of U.S. Provisional Patent Application Ser. No. 61/989,611, titled "Five Axis Optical Inspection System." The disclosure of U.S. 61/989,611 is incorporated by reference herein in its entirety.

BACKGROUND

For flat parts, like printed circuit boards and silicon wafers, optical inspection systems operate nicely in a three axis configuration. The X and Y axes are used to position the workpiece relative to a camera or a sensor and a Z axis provides focus. The camera used with an optical inspection system needs to be aimed squarely at the feature to be inspected or parallax imaging distortions will cause measurement errors. For workpieces that are generally cylindrical, like a medical stent or a machined piston, mounting the part on a rotary or fourth axis provides the camera with a straight on view of any area of the part. However, when a part has complex contours like, for example, a bullet, obtaining a high resolution image at each point on the surface while aiming the camera normal to a surface patch requires a five axis of motion optical inspection system.

Traditional five axis motion systems used with optical inspection have drawbacks that make them less than ideal. One approach has the part under inspection mounted on a rotary table and then this rotary table is mounted on a second rotary table to obtain the fifth or tilting axis. A drawback is that the amount of mass that the tilting rotary is moving is significantly higher than that of just the part. This makes inspection operations slower than that of a four axis inspection system. It also makes lighting the part for optical inspection more challenging as the mass of the dual rotaries can now preclude convenient placement of lighting components. Five axis motion systems of this type produced by Optical Gauging Products of Rochester, N.Y., USA and Werth Messtechnik, of Giessen, Germany.

An alternative approach to the fifth tilting axis is to mount the camera and lens components of the inspection system on a rotational stage which is in-turn attached to a Z-axis. One drawback with this approach is that increased mass is added to one of the existing stage axes. A further drawback is that the length of the optical track from object to image at the camera must be accommodated by the stage travel of the system. This can add significant size and cost to the system.

BRIEF SUMMARY

An object disclosed herein is to provide a system to create high-resolution images of parts with complex contours at high speed and with a minimum of stage travel and overall system size. It is a further goal to provide uniform illumination of the object under inspection both using both profile and surface illumination.

In accordance with one embodiment, that object is achieved by an inspection system that is effective to collect images of a part under inspection. This inspection system includes (a) a three axis linear motion stage; (b) a rotary fourth axis stage configured to hold and rotate an object to be inspected. This rotary fourth axis stage is mounted on the three axis linear stage; (c) a fifth axis camera and optical system mounted to one of the axes of the three axis linear motion stage. This fifth axis camera has an optical axis substantially parallel to the axis of linear motion; (d) a 45 degree mirror configured to bend the optical axis of the fifth axis camera by 90° to point towards the object; and (e) a motor configured to rotate the mirror over a range of angles to obtain a fifth axis of viewing orientation. In a preferred embodiment, the motor also rotates the lens and camera along with the mirror.

DETAILED DESCRIPTION

Figure 2:
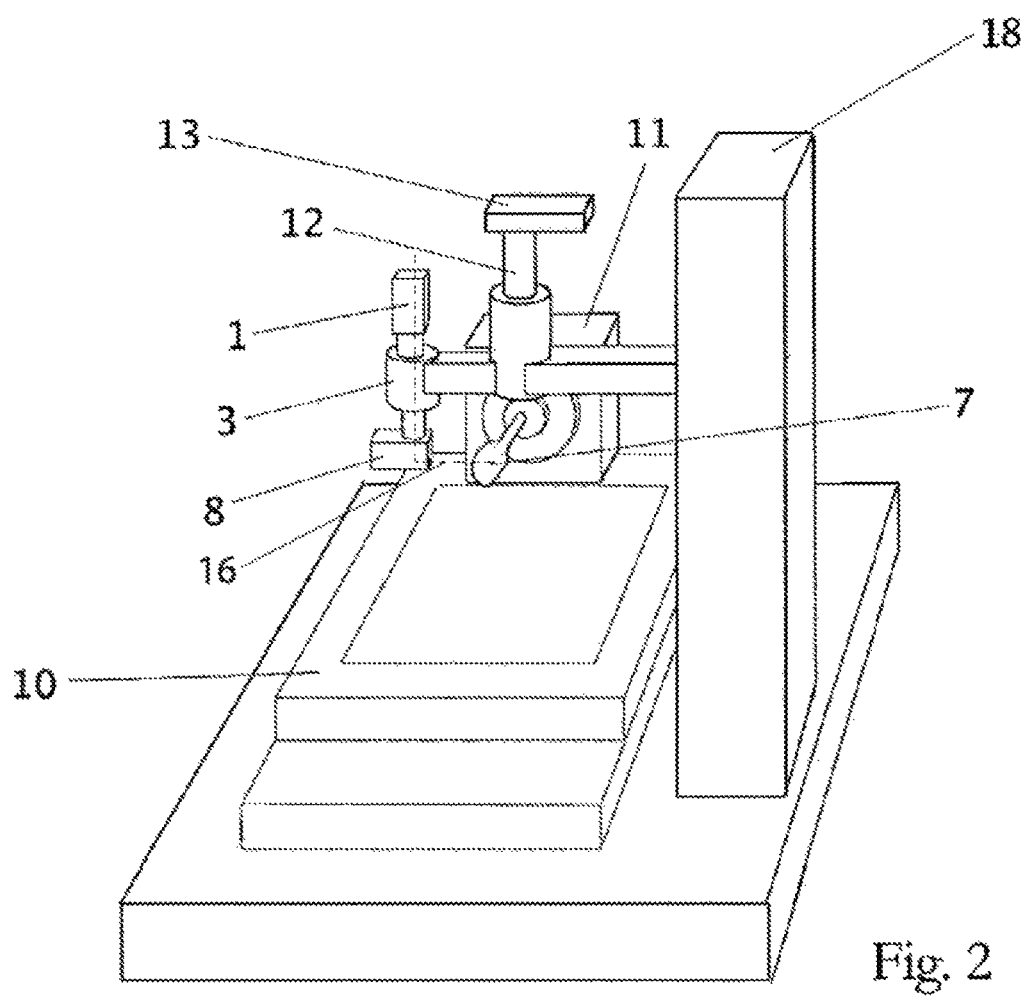
FIG. 2 schematically illustrates a five axis inspection system including the fifth axis viewer of FIG. 1.

With reference to FIG. 2, the system described herein includes a conventional X, Y, Z three orthogonal axes of motion stage 10. A fourth axis is introduced, as is known from four axis inspection systems, that is driven by a motor 11 mounted on the X or Y stage axis with the part 7. A four axis system is disclosed in U.S. Pat. No. 8,811,691, titled "Stent Inspection System," by Freifeld. The disclosure of U.S. Pat. No. 8,811,691 is incorporated by reference herein in its entirety.

Figure 1:
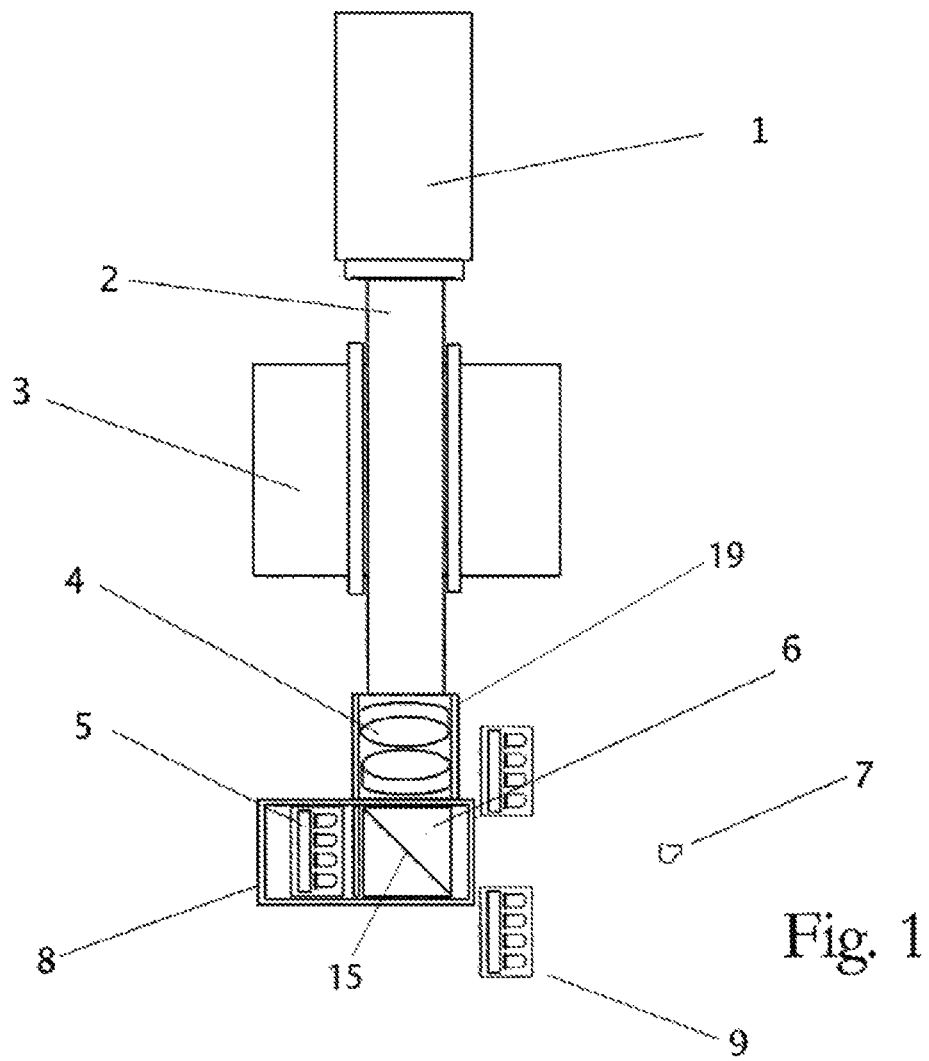
FIG. 1 schematically illustrates a fifth axis viewer in accordance with an embodiment disclosed herein.

A key feature of the present embodiment is to locate the optical axis of the lens and camera 1 for viewing part 7 features mounted as is commonly found on traditional machines on the Z-axis 14 with the optical axis substantially parallel to the Z-axis 18. Referring now to FIG. 1, a computer numerically controlled right angle reflector 15 is then utilized to bend the traditionally downward facing optical axis 16 by 90 degrees and a motor 3 to drive this right angle beam splitter cube 6 to point outward to the part 7.

In one preferred embodiment the entire camera 1, lens 4 and right angle reflector 15 are all rotated by the fifth axis of motion motor 3 about the primary optical axis 16. The immediate advantage of this method is that the mass of the reflector 15 and, optionally, the mass of the lens 4 and camera 1 are being rotated about their own center of mass thus keeping the moment inertia to a minimum and the space taken in the system stage layout to a minimum as well. This allows for high-speed motion with fast mechanical settling times. The entire package size of this fifth axis configuration can be minimized mechanically by configuring the optical axis 16 to be on center and within the fifth axis motor 3, so long as a motor 3 with a hollow shaft 19 of sufficient diameter to allow the full optical path of the system to propagate without vignetting is provided. If the lens 4 is telecentric, the optical system is well disposed for gauging applications.

By using a cube beamsplitter 6 to provide the 90 degree redirection of the optical axis 16, illumination can be introduced to the part through the beamsplitter 6 with the right angle reflector 15 being a partially reflective mirror. Introducing bright field illumination via light source 5 has advantages over traditional epi-illumination or through the objective lens surface illumination. First, this simplifies the optical configuration. In the more traditional configuration a beamsplitter cube must be placed in a collimated space between the first lens objective and a camera relay lens. This increases the size and complexity of the optical system and tends to introduce stray illumination into the camera, softening the image. Moreover, illumination introduced at the beamsplitter cube below the primary objective can cover a wider angle of illumination as it is not limited by the coverage angle as defined by the numerical aperture of the lens. This can provide a more broadly illuminated object improving image quality. Adding a ring light 9 in front of the beamsplitter 6 as a dark field source of illumination can provide an especially broad coverage of illumination. Alternatively, if light is not desired to be directed onto the part from behind the beamsplitter 6, a simple mirror instead of a more elaborate beam splitter cube. The two light sources on either side of the partially reflecting mirror can be operated either individually or simultaneously to create a large area of combined dark and bright field illumination coverage With reference back to FIG. 2, a further approach is to add a large area camera 13 and lens 12 to obtain a rotational or a flat scan of the part 7 under inspection. For parts that are generally rotationally symmetric it is especially advantageous if the large area camera 13 is a line scan camera. From these large area views the positions of features to be inspected by the fifth axis camera 1 can be more easily determined in spatial coordinates then strictly by driving the fifth axis through a series of predetermined computer numerically controlled moves. This is especially helpful when inspecting parts that are not completely rigid as features are not always where one might expect them based on their design model.

FIG. 1 schematically illustrates a fifth axis viewer. A camera 1 views an object 7 through a tube 2, a lens 4 and finally a beamsplitter cube 6. In this embodiment the entire optical system is rotated about a portion of the optical axis 16 by motor 3. The viewer module 8 has an internal light source 5 positioned so its light shines through the beamsplitter cube 6 and onto the object 7 under inspection. A ring light 9 is added in front of the beam splitter cube so that its light also hits the object 7.

FIG. 2 schematically illustrates a full view of a five axis inspection system containing the right angle fifth axis viewer 8 driven by a rotating motor 3 to capture images of object 7 in any angular orientation by camera 1. The part 7 under inspection is mounted on a rotary motor stage 11, the fourth axis of the system, which in turn is mounted to a three axis linear positioning stage 10. The system also contains a lens 12 having an extended depth of focus of 5 mm or more that is used for taking flat or rotational large area images of the part 7 using a line scan camera 13.

In an embodiment, the inspection system includes a digital camera and a lens defining an optical axis. There is a partial mirror below, the lens redirecting the optical axis 90 degrees to view an object. An extended area light source is placed behind and configured to direct light through said partial mirror to provided extended bright field illumination on said object with a broad angle of coverage. The inspection system light source includes light emitting diodes and the partial mirror is a beam splitter cube.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed:

1. An inspection system effective to collect images of a part under inspection, comprising:

a) a three axis linear motion stage;
b) a rotary fourth axis stage configured to hold and rotate an object to be inspected, said rotary fourth axis stage mounted on said three axis linear stage;
c) a fifth axis camera and optical system mounted to one of the axes of the three axis linear motion stage, said fifth axis camera having an optical axis substantially parallel to this axis of linear motion;
d) a 45 degree mirror configured to bend said optical axis of the fifth axis camera by 90° to point towards said object, wherein the 45 degree mirror is a partially reflecting mirror and a first light source is placed on one side of the partially reflecting mirror substantially perpendicular to the optical axis bent by the 45 degree mirror so that the light from the first light source is directed as bright field illumination at the object under inspection;
e) a motor configured to rotate the mirror over a range of angles to obtain a fifth axis of viewing orientation; and
f) a second light source capable of illuminating said object is placed in front of said 45 degree mirror and acts as a dark field source of illumination.

2. The inspection system of claim 1 wherein said motor also rotates the entire fifth axis optical system.

3. The inspection system of claim 1 wherein a second light source is a ring light source and is placed in front of said 45 degree mirror with the turned optical viewing axis directed through the center of the ring light source.

4. The inspection system of claim 3 wherein the two light sources on either side of the partially reflecting mirror can be operated either individually or simultaneously to create a large area of combined dark and bright field illumination coverage.

5. The optical system of claim 1 wherein the fifth axis optical system includes a telecentric lens.

6. The inspection system of claim 1 further including a large format camera viewing the object through a large format lens mounted on one axis of the three axis linear motion stage, the large format camera configured to capture large area images of the object under inspection and to direct the fifth axis camera to specific feature locations on said object based on found feature locations within the large format image.

7. The inspection system of claim 6 wherein the large format camera is a line scan camera.

8. The inspection system of claim 6 wherein the large format lens utilizes a telecentric design with an extended depth of focus of at least 5 mm.

9. An inspection system comprising:

a multi-axis motion stage;
a rotary axis mounted to the multi-axis motion stage and configured to hold an object;
a digital camera and lens defining an optical axis;
a partial mirror redirecting said optical axis 90 degrees to view the object;
a motor configured to rotate the partial mirror;
an extended area light source configured to direct light through said partial mirror to provide extended bright field illumination on said object; and
a dark field source of illumination arranged such that the partial mirror is between the extended field source of illumination and the extended area light source.

10. The inspection system of claim 9 wherein said light source includes light emitting diodes.

11. The inspection system of claim 9 wherein said partial mirror is a beam splitter cube.

\* \* \* \* \*